United States Patent
Lepp et al.

(10) Patent No.: US 10,278,117 B2
(45) Date of Patent: Apr. 30, 2019

(54) RANDOMIZED BEACON TRANSMISSIONS

(71) Applicant: BLACKBERRY LIMITED, Waterloo (CA)

(72) Inventors: James Randolph Winter Lepp, Ottawa (CA); Stephen John Barrett, Heath (GB)

(73) Assignee: BlackBerry Limited, Waterloo, Ontario (CA)

( * ) Notice: Subject to any disclaimer, the term of this patent is extended or adjusted under 35 U.S.C. 154(b) by 330 days.

(21) Appl. No.: 14/699,484

(22) Filed: Apr. 29, 2015

(65) Prior Publication Data

US 2016/0323811 A1  Nov. 3, 2016

(51) Int. Cl.
*H04W 84/12* (2009.01)
*H04W 48/12* (2009.01)

(52) U.S. Cl.
CPC ............ *H04W 48/12* (2013.01); *H04W 84/12* (2013.01)

(58) Field of Classification Search
CPC ............................... H04W 48/16; H04W 84/12
See application file for complete search history.

(56) References Cited

U.S. PATENT DOCUMENTS

| | | | |
|---|---|---|---|
| 7,526,295 B2 * | 4/2009 | Khare | G06F 21/35 455/411 |
| 7,564,812 B1 | 7/2009 | Elliott | |
| 7,949,376 B2 * | 5/2011 | Maekawa | H04L 12/12 370/318 |
| 8,428,079 B1 | 4/2013 | Lambert et al. | |
| 2005/0135284 A1 * | 6/2005 | Nanda | H04L 29/06068 370/294 |
| 2006/0072507 A1 * | 4/2006 | Chandra | H04W 36/245 370/332 |
| 2006/0268804 A1 | 11/2006 | Kim et al. | |
| 2008/0137599 A1 | 6/2008 | Ham et al. | |
| 2009/0016305 A1 | 1/2009 | Lee | |
| 2009/0017839 A1 * | 1/2009 | Kim | H04L 63/10 455/456.1 |
| 2009/0122783 A1 | 5/2009 | Tanaka et al. | |

(Continued)

FOREIGN PATENT DOCUMENTS

CN 102083163 6/2011
WO WO 2013147873 A1 * 10/2013 ........... G06F 21/602

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, pp. 1-1162.

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, pp. 1163-2695.

(Continued)

*Primary Examiner* — Lan-Huong Truong
(74) *Attorney, Agent, or Firm* — Trop, Pruner & Hu, P.C.

(57) ABSTRACT

A deterministic random number generator at a first wireless communication node computes a pseudorandom number. The deterministic random number generator employs a same random number generation algorithm as a random number generator of a second wireless communication node. The first wireless communication node determines a timing of a randomized beacon transmission using the computed pseudorandom number.

20 Claims, 6 Drawing Sheets

(56) References Cited

U.S. PATENT DOCUMENTS

| | | | |
|---|---|---|---|
| 2010/0142365 A1* | 6/2010 | Richardson | H04L 1/0045 370/210 |
| 2011/0149798 A1 | 6/2011 | Cordeiro et al. | |
| 2011/0274021 A1* | 11/2011 | He | H04W 52/0238 370/311 |
| 2011/0299421 A1 | 12/2011 | Werb et al. | |
| 2012/0213211 A1* | 8/2012 | Remaker | H04L 63/0421 370/338 |
| 2014/0056192 A1 | 2/2014 | Meylan et al. | |
| 2014/0192785 A1 | 7/2014 | Gong | |
| 2014/0355576 A1 | 12/2014 | Wang et al. | |
| 2015/0023236 A1* | 1/2015 | Choi | H04W 52/0225 370/311 |
| 2015/0052255 A1* | 2/2015 | Sun | H04L 49/253 709/227 |
| 2015/0103812 A1* | 4/2015 | Zhao | H04W 48/16 370/338 |
| 2015/0282157 A1* | 10/2015 | Kim | H04W 48/14 370/329 |
| 2016/0105314 A1* | 4/2016 | Logue | H04L 67/141 726/4 |

OTHER PUBLICATIONS

WiFi Alliance, Wi-Fi Peer-to-Peer (P2P) Technical Specification, Version 1.5, 2014 (183 pages).

http://wifinigel.blogspot.co.uk—How Much Air-Time Do Beacons Actually Burn? Aug. 16, 2013 (3 pages).

Aruba Networks, Improve Air Quality by Minimizing SSIDs: Using Role-Based Access to Increase Wi-Fi Application Performance, Oct. 2010 (16 pages).

Canadian Intellectual Property Office, International Search Report and Written Opinion for PCT/CA2016/050356 dated Jun. 10, 2016 (11 pages).

Ennis et al., Synchronization and Scanning in DFWMAC, IEEE P802.11-93/193, Nov. 1993 (4 pages).

European Patent Office, Supplementary Partial European Search Report for EP 16785703.6 dated Jul. 20, 2018 (18 pages).

European Patent Office, Extended European Search Report for EP 16785703.6 dated Sep. 19, 2018 (19 pages).

\* cited by examiner

RANDOMIZED BEACON TRANSMISSIONS

BACKGROUND

Devices such as computers, handheld devices, or other types of devices can communicate over wired or wireless networks. Wireless networks can include a wireless local area network (WLAN), which includes wireless access points to which devices are able to wirelessly connect.

BRIEF DESCRIPTION OF THE DRAWINGS

Some implementations are described with respect to the following figures.

DETAILED DESCRIPTION

Figure 1:
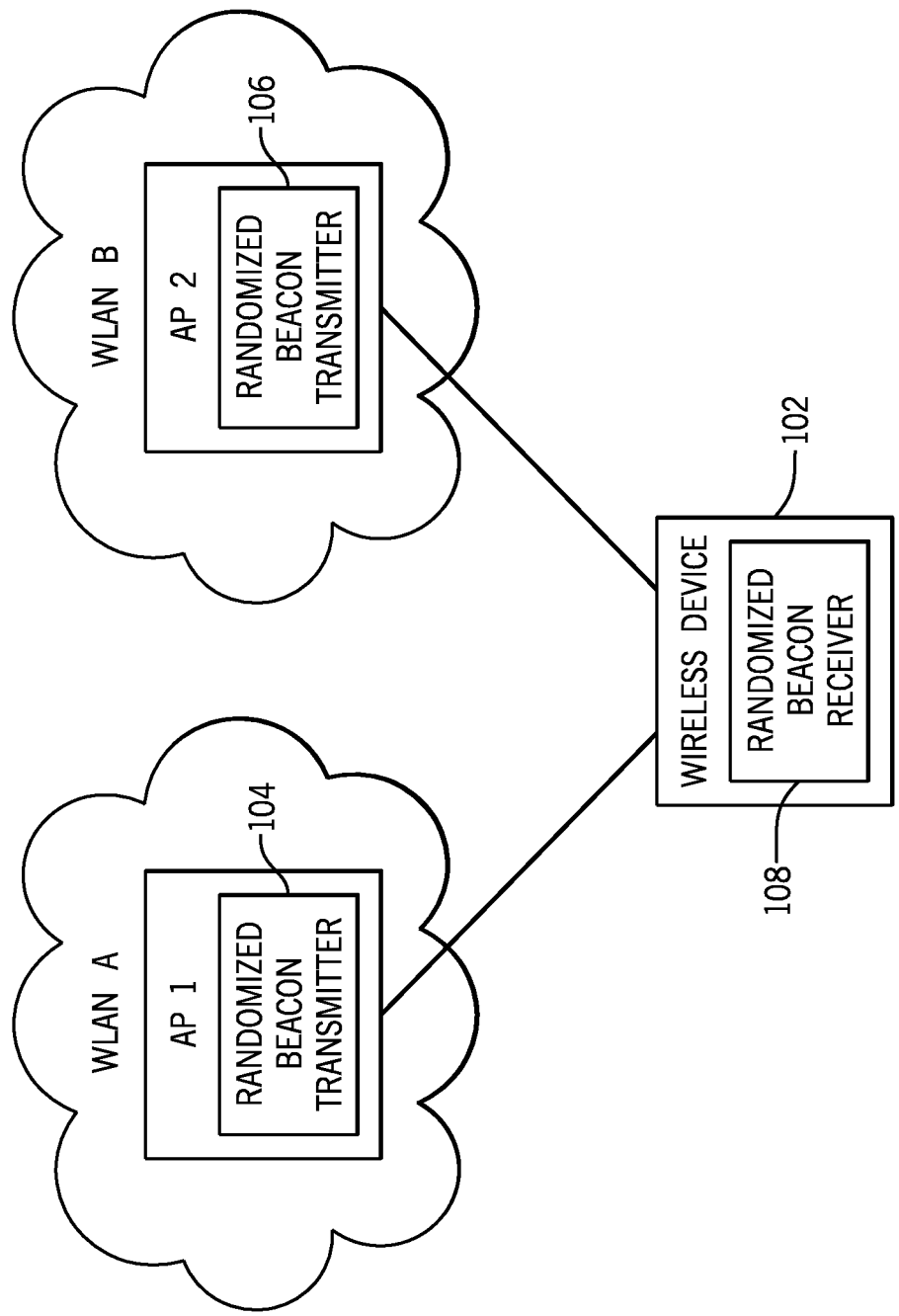
FIG. 1 is a block diagram of an example arrangement that includes wireless access points of a wireless local area network (WLAN), in some examples.

In some scenarios, a wireless device may communicate with multiple wireless access points (APs) of a wireless local area network (WLAN). A wireless AP (or more simply, an AP) can refer to a communication device to which a wireless device can establish a wireless connection to communicate with other endpoint devices. WLANs can include those that operate according to the Institute of Electrical and Electronic Engineers (IEEE) 802.11 Specifications. In other examples, WLANs can operate according to other protocols. Examples of wireless devices include computers (e.g. tablet computers, notebook computers, desktop computers, etc.), handheld devices (e.g. smartphones, personal digital assistants, wearable devices, etc.), or other types of endpoint or user devices that are able to communicate wirelessly.

A scenario where a wireless device may communicate with multiple APs is one in which a cellular network operator offloads a portion of data traffic communications to a WLAN. A cellular network operator operates a cellular radio access network (RAN) that includes cells and associated cellular access network nodes. A wireless device within a cell can connect to a corresponding cellular access network node to allow the wireless device to communicate with other devices.

Cellular network operators that provide cellular networks in licensed spectrum are running out of suitable new spectrum to purchase, and the spectrum that is available can be costly to license. Thus cellular network operators are looking for ways to extend cellular networks to use unlicensed spectrum. Unlicensed spectrum refers to frequencies that governments and regulators have set aside for wireless devices to use without a fee, so long as they can accept interference from other devices operating in the same spectrum. No single operator or network technology can claim exclusivity in this spectrum.

A way to expand the capacity of a cellular network is to make use of both the licensed spectrum and unlicensed spectrum (such as the spectrum used by a WLAN). In some cases, this can be accomplished by connecting wireless devices using two different protocols to two different types of networks (the cellular access network and the WLAN). Offloading of data traffic can refer to moving at least a portion of data communication from a cellular access network to a different network such as a WLAN, such that a portion of data traffic is communicated using the WLAN instead of the cellular access network, which allows for increased overall bandwidth for data traffic communications of the wireless device.

A cellular network operator is able to control a wireless device to cause the wireless device to be connected to an AP in a WLAN that is deployed by the cellular network operator. This ability of the cellular network operator to control the wireless device may conflict with a user's intended use and configuration for WLAN communications. As an example, a user may specify WLAN preferences such that the device is preferentially connected to an AP in the user's office WLAN. On the other hand, the cellular network operator may want the wireless device to be connected to an AP in an operator-deployed WLAN.

To address the foregoing, a wireless device can be configured to allow the wireless device to communicate with multiple APs, where one AP can be cellular network operator controlled and the other AP can be the AP that is user preferred. In this manner, both the cellular network operator and the user can have the WLAN connectivity specified respectively by the cellular network operator and the user.

A wireless device that is concurrently wirelessly connected to (also referred to as concurrently associated with) multiple APs can refer to the wireless device obtaining service from the multiple APs. A wireless device can be concurrently wirelessly connected to multiple APs while not communicating data simultaneously with the multiple APs. At any given instant in time, such as when just one channel is used, a wireless device can transmit data to or receive data from a first AP while not simultaneously communicating data with a second AP. In some circumstances however, it will also be possible to communicate at the same time to/from multiple APs (such as when different channels are used).

Although reference is made to connecting a wireless device to multiple APs in the context of WLAN-cellular interworking (where data traffic communication can be offloaded from a cellular access network node to a WLAN), it is noted that there can be other scenarios where a wireless device can concurrently connect to multiple APs (possibly in multiple respective WLANs).

In some cases, it is possible for the multiple APs to which the wireless device is concurrently connected to operate in the same channel (same frequency band). In some examples, the multiple APs to which the wireless device is concurrently connected may operate on the same channel. A first AP is within a coverage range of a second AP if the first AP is able to receive and decode wireless signals transmitted by the second AP. A first AP is not within a coverage range of a second AP if the first AP is unable to receive and decode wireless signals transmitted by the second AP. Note that if the first and second APs are within coverage range of each other, auto-configuration can be performed by the APs to avoid selecting the same channel for communicating with a particular wireless device; however in dense deployment scenarios the lack of unused channels necessarily means multiple APs will be operating on the same channel sharing the spectrum with each other.

In further examples, a wireless device may employ just one physical (PHY) hardware resource for WLAN communications, in which case the wireless device would communicate with multiple APs using the same channel. As other examples, there may be benefits to using a common channel to communicate with multiple APs, such as from a quality of service (QoS) or resource utilization perspective by avoiding having to perform coarse and sometimes resource inefficient time switching between channels.

FIG. 1 illustrates an example where a wireless device 102 is concurrently connected to multiple APs (AP 1 and AP 2) that are part of respective different WLANs (WLAN A and WLAN B). Although each WLAN A or B is depicted as including a respective single AP, it is noted that a WLAN can include multiple APs in some examples. Also, in other examples, the wireless device 102 can be concurrently connected to more than two APs.

An AP can transmit a beacon (also referred to as a beacon frame). In some implementations, a beacon frame is a management frame according to the IEE) 802.11 Specifications. A beacon frame can contain various information about a WLAN. For example, the beacon frame can include capability information regarding the capability of an AP or the WLAN. The beacon frame can also indicate a type of network, such as an Ad Hoc or Infrastructure network type. The beacon frame can also include a Service Set Identifier (SSID) that identifies a network, information indicating supported data rates, and/or other information.

According to IEEE 802.11, beacon frames are transmitted periodically to announce the presence of a WLAN. Beacon frames are transmitted by an AP in an Infrastructure Basic Service Set (BSS).

Issue 1

A first issue (Issue 1) may arise when beacon transmissions from multiple APs overlap all or most of the time, which may cause a wireless device to be unable to read system information or other information, such as traffic indication map (TIM) or Delivery Traffic Indication Map (DTIM) messages, as examples. A beacon transmission can refer to a transmission of a beacon frame (or more simply, a transmission of a beacon).

If multiple APs are within coverage range of each other (in other words, the APs can hear each other), then beacon overlap should not occur if a listen-before-talk mechanism is applied to the transmission of beacons. The listen-before-talk mechanism is applied as part of carrier sense multiple access with collision avoidance (CSMA-CA), where a first device (such as a first AP) can listen to a channel to check that no other device (such as another AP) is transmitting, before the first device transmits in this channel.

However, if multiple APs to which the wireless device 102 is concurrently connected are unable to hear each other (the APs are not within coverage range of each other), then one AP can be considered a hidden node with respect to the other AP. In the hidden node scenario, beacon transmissions of the APs may overlap.

Overlapping beacons can cause the signal-to-noise ratio (SNR) of a beacon transmission from a first AP to be poorer due to noise from the beacon transmission of the second AP. This makes it more difficult for a wireless device to decode the beacon from the first AP. The reverse situation can also occur, where decoding of the beacon from the second AP is made more difficult due to noise of the beacon transmission from the first AP. As a result, the wireless device 102 may not be able to receive the beacon transmission of an AP, and hence would not be able to associate with the AP.

Once the wireless device 102 is associated with an AP, the impact of beacon overlap can be to increase the frame error rate of a received beacon. The frame error rate can refer to a rate of errors in decoding the content of a beacon frame.

When the device 102 is to be concurrently associated with (connected to) multiple APs, the wireless device 102 has to be able to read the beacons from the multiple APs. Reading the beacons from the APs allows the wireless device 102 to receive paging messages, such as TIM or DTIM messages. Because the wireless device 102 has to be able to receive the beacons from the multiple APs, then the impact of overlapping can be exacerbated as compared to the legacy situation discussed above, since it is not acceptable for the wireless device 102 to detect the beacon of just one AP while considering the beacon transmission of the other AP as being an interference source. As a result, the wireless device 102 may not be able to decode two beacon transmissions that are occurring on the same channel at the same time, since traditional baseband processing or other types of processing may not be able to decode multiple beacon transmissions at a time. Thus, Issue 1 refers to the issue of a wireless device's inability to decode multiple overlapping beacon transmissions from multiple APs.

Although reference is made to beacon transmissions performed by APs, it is noted that in some scenarios, wireless devices can behave like APs, and thus, can also transmit beacons. For example, wireless devices can perform Wi-Fi peer-to-peer (P2P) or Wi-Fi Direct communications, where wireless devices (such as mobile devices) are able to communicate wirelessly with each other without the communicated data passing through an infrastructure AP.

Issue 2

In scenarios where the wireless device 102 is concurrently connected to multiple APs, and the APs are unable to hear each other (hidden node scenario), a second issue (Issue 2) caused by overlap of downlink data transmissions from the APs may occur. A downlink data transmission refers to a transmission of data from an AP to the wireless device 102. The multiple APs to which the wireless device 102 is concurrently connected may transmit data in the same channel at the same time, such that the downlink data transmitted by the APs cannot be successfully decoded by the wireless device 102.

Randomized Beacon Transmissions

In accordance with some implementations, to address Issue 1 discussed above, randomized beacon transmissions can be performed by at least one of the APs to which the wireless device 102 is concurrently connected. As shown in FIG. 1, AP 1 includes a randomized beacon transmitter 104, and AP 2 includes a randomized beacon transmitter 106. In further examples, just one of the APs can include a randomized beacon transmitter. In further examples, where the wireless device 102 can be concurrently connected to more than two APs, then each of at least a subset of at least two or more APs can include a respective randomized beacon transmitter.

A randomized beacon transmitter is able to send a randomized beacon transmission according to a timing that is determined using a pseudorandom number produced by a deterministic random number generator.

The wireless device 102 includes a randomized beacon receiver 108 that is able to receive a randomized beacon transmission from an AP, as sent by the randomized beacon transmitter 104 or 106. The randomized beacon receiver 108 is able to determine a timing of the randomized beacon transmission using a deterministic random number generator.

A deterministic random number generator is a random number generator at a first wireless communication node (an AP or the wireless device 102) that applies a same random number generation algorithm as that used in a second wireless communication node (the other of the AP and the wireless device 102). For example, the random number generation algorithm of the deterministic random number generator used by AP 1 can be the same as the random number generation algorithm used by the deterministic random number generator in the wireless device 102. By using the same random number generation algorithm in AP 1 and the wireless device 102, both the transmitting device (AP 1) and the receiving device (wireless device 102) can derive the same timing for the randomized beacon transmission sent by AP 1. In this way, the randomized beacon receiver 108 in the wireless device 102 would be able to determine the timing of the next randomized beacon transmission, so that the randomized beacon receiver 108 would be able to successfully receive the next randomized beacon transmission from the randomized beacon transmitter 104 of AP 1.

Due to the ability of the randomized beacon receiver 108 to determine a timing of the randomized beacon transmission from an AP, the wireless device 102 does not have to continually monitor for the randomized beacon transmission, which can conserve power of the wireless device 102. To further conserve power of the wireless device 102, the wireless device 102 is able to enter into a power saving mode (e.g. a sleep state) in intervals between randomized beacon transmissions. A power saving mode refers to a mode of the wireless device 102 where the amount of power consumed is less than during a normal operation of the wireless device 102. For example, certain electronic components in the wireless device 102 may be powered off to achieve the power saving mode.

The wireless device 102 is able to wake up from the power saving mode, on an intermittent basis, to transition from the power saving mode to an active receiving state at the timing determined using a computed pseudorandom number to read the randomized beacon transmissions and to receive paging messages or other indications. Since the randomized beacon receiver 108 of the wireless device 102 uses the same random number generation algorithm as the AP that transmitted randomized beacon transmissions, the wireless device 102 is able to determine the specific timings of the randomized beacon transmissions, so that the wireless device 102 can wake up from the power saving mode at the appropriate times.

Figure 2:
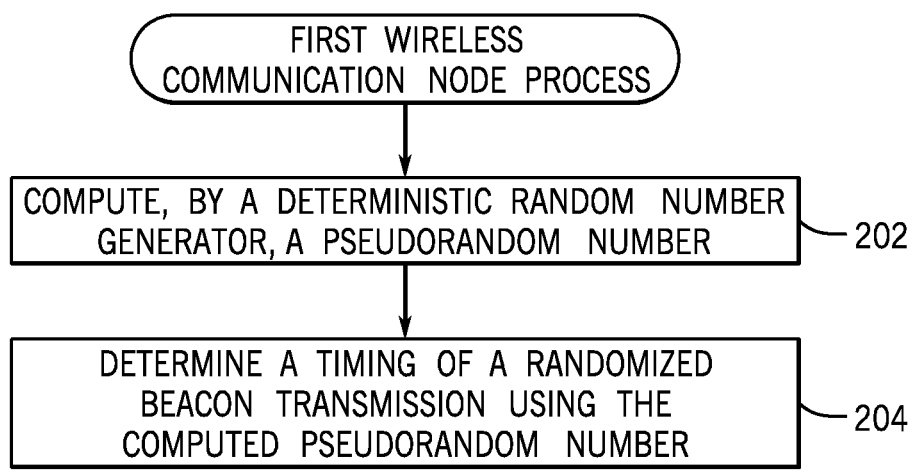
FIG. 2 is a flow diagram of a process of a wireless communication node, according to some implementations.

FIG. 2 is a flow diagram of a process according to some implementations that can be performed by a first wireless communication node. More specifically, the process of FIG. 2 can be performed by the randomized beacon transmitter 104 or the randomized beacon receiver 108 of FIG. 1. The first wireless communication node can be an AP (AP 1 or AP 2 in FIG. 1) or the wireless device 102. According to the terminology of IEEE 802.11, an AP or the wireless device 102 can be referred to as a station (STA), which refers to a device that is able to use the IEEE 802.11 protocol for communications. The wireless device 102 can also be referred to as a WLAN non-AP STA (or more simply, non-AP STA).

A deterministic random number generator at the first wireless communication node computes (at 202) a pseudorandom number. As noted above, this deterministic random number generator at the first wireless communication node employs a same random number generation algorithm as a random number generator of a second wireless communication node.

The first wireless communication node determines (at 204) a timing of the randomized beacon transmission using the computed pseudorandom number. If the first wireless communication node is an AP, then the timing is used for transmitting the randomized beacon transmission. If the first wireless communication node is the wireless device 102, then the timing is used for receiving the randomized beacon transmission.

In examples where the first wireless communication node is the wireless device 102 (a non-AP STA) and the wireless device 102 is associated with multiple APs on different channels (different frequency bands), the wireless device 102 is able to tune its radio receiver to a given channel (on which a randomized beacon transmission is sent) to receive the randomized beacon transmission from an AP.

Overlay Randomized Beacon Transmissions

Figure 3:
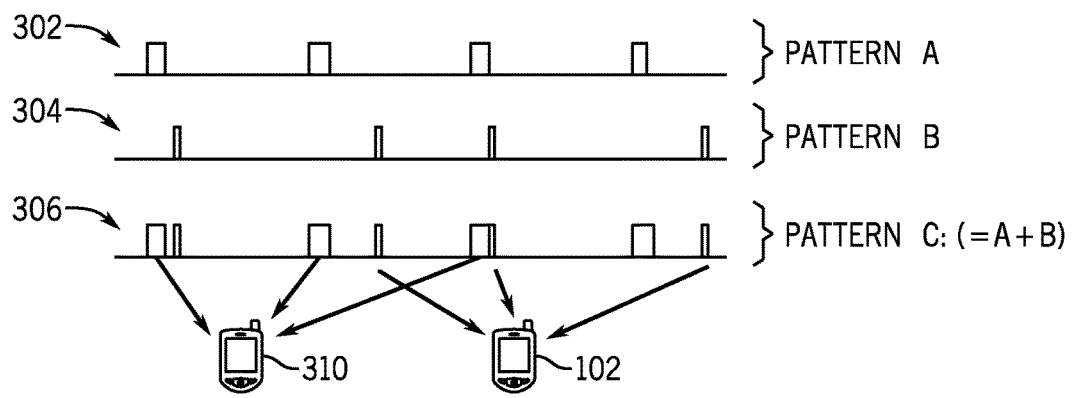
FIGS. 3 and 5 illustrate beacon transmissions according to various implementations.

FIG. 3 shows an example where randomized beacon transmissions can be overlaid on periodic beacon transmissions from an AP, such as AP 1 or AP 2. FIG. 3 shows periodic transmissions of beacons 302 (Pattern A) transmitted by the AP. Each beacon is represented by a rectangle. The periodic beacon transmissions 302 may be at a relatively low periodic rate (in other words, the periodic beacons can be transmitted relatively infrequently. The transmission of relatively infrequent periodic beacons may be performed to support legacy wireless devices, such as legacy wireless device 310. A legacy wireless device is a wireless device that does not support concurrent associations (connections) with multiple APs.

In addition to the periodic beacon transmissions 302, an additional set of randomized beacon transmissions 304 (Pattern B) can be transmitted by the AP. The randomized beacon transmissions 304 are overlaid onto the periodic beacon transmissions 302 to form a combined set of beacon transmissions 306 (Pattern C). Pattern C is Pattern A plus Pattern B. The combined set of beacon transmissions 306 thus includes both the periodic and randomized beacon transmissions 302 and 304. By overlaying the randomized beacon transmissions onto the periodic beacon transmissions, the data rate of the randomized beacon transmissions can be relatively high (higher than that of the periodic beacon transmissions). For example, the data rate of the randomized beacon transmissions can be a data rate achievable according to IEEE 802.11ac. The legacy wireless device 310 can read the periodic beacon transmissions in the combined set of beacon transmissions 306 (but not the randomized beacon transmissions 304), while the wireless device 102 is able to read both the randomized and periodic beacon transmissions in the combined set of beacon transmissions 306. In cases where backwards compatibility does not have to be provided, an AP may transmit only the randomized beacon pattern 304 on its own without the overlaid periodic beacons 306.

The following describes example tasks that can be performed by the wireless device 102 (a non-AP STA) to allow the wireless device 102 to receive a randomized beacon transmission from an AP. To obtain information from a given AP, the wireless device 102 sends a Probe Request, which is a message sent by the wireless device 102 to learn about the availability of a WLAN in the area where the wireless device 102 is located. The given AP responds to the Probe Request with a Probe Response that is sent to the wireless device 102.

It can be assumed that the wireless device 102 may be unable to read periodic beacons due to overlapping beacons from multiple APs. The Probe Response that is sent by the given AP contains information such as the information contained in the beacon, as well as additional information about the beacon timing.

Figure 4:
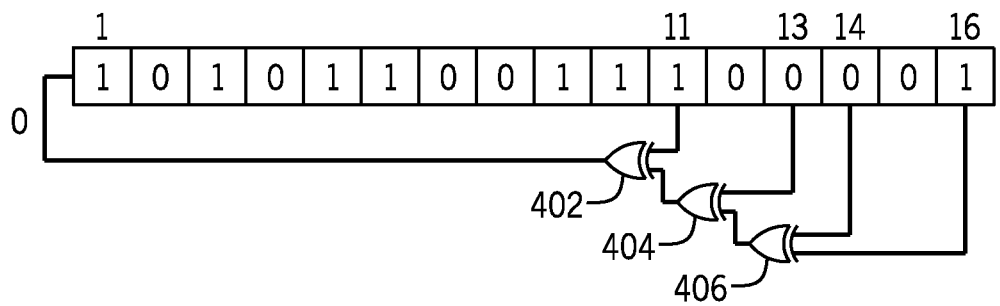
FIG. 4 is a schematic diagram of a linear feedback shift register used as part of a random number generator according to some implementations.

In accordance with some implementations of the present disclosure, the Probe Response can include one or more of the following information elements:

(1) A timestamp of the given AP, where the timestamp is based on the content of a counter (e.g. a 64-bit counter) in the given AP.
(2) The period of the periodic beacon, $T_{periodic\_beacon}$.
(3) The start time of the next periodic beacon relative to the timestamp (assuming the wireless device 102 is unable to determine the start time using information elements (1) and (2) and rules of the IEEE 802.11 Specifications).
(4) The current content of a linear feedback shift register (an example of a random number generator). An example linear feedback shift register 400 is depicted in FIG. 4. Note that the feedback taps in the linear feedback shift register 400 (positions 11, 13, 14, and 16 of the Register 400 shown in FIG. 4) can be specified. The feedback (through XOR gates 402, 404, and 406) is provided to position 1 of the linear feedback shift register 400. Although a specific example of a random number generator is shown in FIG. 4, it is noted that in other examples, other types of random number generators can be used, so long as both the transmitting device (that transmits a randomized beacon) and the receiving device are able to derive the same pseudorandom number in each respective cycle. More generally, the Probe Response can include a value of the deterministic random number generator of the AP, where the value can include a seed value for the deterministic random number generator, or the current settings of the bits in the shift register that is part of the deterministic random number generator.

Using the foregoing information, the wireless device 102 is able to compute the timing of a future planned periodic beacon transmission and also the timing of a future randomized beacon transmission.

To address the issue of the wireless device's clock and the given AP's clock eventually becoming out of synchronization, the wireless device 102 can occasionally re-trigger the Probe Request/Response procedure to obtain the latest timestamp information from the given AP.

In every beacon transmission period ($T_{periodic\_beacon}$), the wireless device 102 and AP can compute the new pseudo-random number (by clocking the respective deterministic random number generator). If the deterministic random number generator can produce a number between 0 and 65,536 (for example), then the time offset of the randomized beacon relative to each periodic beacon can be computed as $T_{periodic\_beacon}/65536$.

In some examples, quantization of the offset ($T_{periodic\_beacon}/65536$) can be performed; for example, the offset can be quantized to the nearest millisecond or IEEE 802.11 Time Unit (TU).

In further implementations, an AP may provide randomized beacon transmissions in response to the following conditions being met:

(A) The wireless device 102 has determined whether beacons are overlapping by, for example, sending probe requests to each AP and receiving information about when periodic beacons are transmitted by each AP. A technique by which this can be performed is explained in more detail below in the section titled "DETECTING POTENTIAL BEACON OVERLAP."
(B) The wireless device 102 has sent a notification to the AP of the beacon overlap issue (and the AP has received the notification). The beacon overlap issue is also referred to as a beacon collision issue.
(C) The wireless device 102 (or other devices that made the same request) is still associated with the AP. In some examples, the wireless device 102 can send periodic keep-alive messages to the AP to allow the AP to determine that the wireless device 102 is still associated with the AP.

This approach of overlaying randomized beacons on periodic beacons can either be applied by just one of the APs or by both the APs to which the wireless device 102 is concurrently associated. If the randomized beacon is transmitted by just one AP (e.g. AP 1) the quality of reception of the randomized beacon can be relatively good, but quality of reception of the pre-existing periodic beacon from AP 2 may be relatively poor (due to the interference from the periodic beacon of AP 1). Quality of reception of beacons of both APs can be enhanced if both APs transmit randomized beacons that overlay periodic beacons.

To reduce the likelihood of interference between randomized beacons transmitted by multiple APs, the randomized beacon transmissions from the APs are configured to be independent (not synchronized). One method is to create different seeds for the deterministic random number generators in the respective APs. This can be achieved in multiple ways, for example, by converting the globally unique Medium Access Control (MAC) address of each AP into a binary number and then applying a modulo N operation to the binary number, where N is the maximum number that the shift register in the pseudorandom number generator can take. By using different seeds in different APs, the pseudo-random numbers generated in the different APs in any given cycle are likely to be different, which leads to different timings of randomized beacon transmissions from the different APs.

Additional Offset Periodic Beacons

In further implementations, instead of performing the overlay of randomized beacon transmissions discussed above, an AP can start broadcasting an additional set of periodic beacon transmissions, which are offset relative to the pre-existing periodic beacon transmissions.

Figure 5:
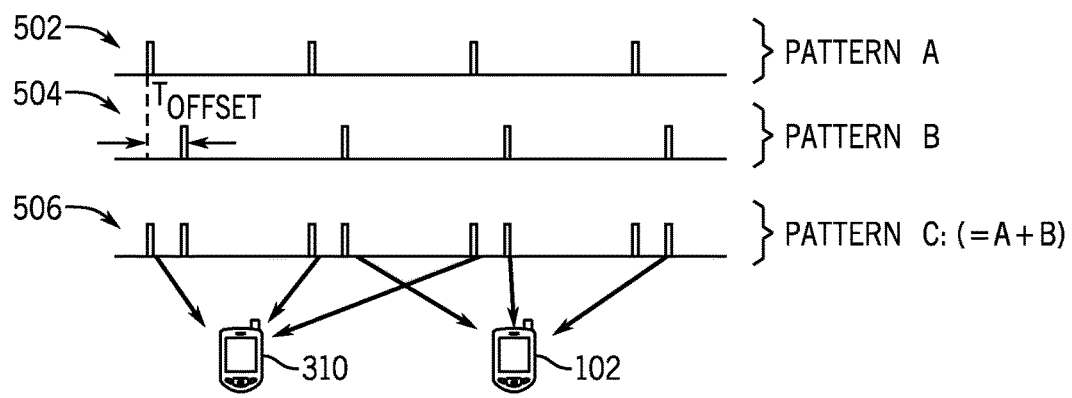

FIG. 5 shows a pre-existing set of periodic beacon transmissions 502 (such as according to IEEE 802.11), and an additional set of periodic beacon transmissions 504. The combined set 506 includes both the pre-existing periodic transmissions 502 and the additional periodic beacon transmissions 504. Each additional periodic beacon transmission is offset from a corresponding pre-existing periodic beacon transmission by a specified time offset ($T_{offset}$), where $T_{offset}$ is a randomized time offset. In FIG. 5, the additional periodic beacon transmissions 504 are also considered randomized beacon transmissions.

The wireless device 102 is able to detect the additional periodic beacon transmissions 504 (as well as the pre-existing beacon transmissions 502), while the legacy wireless device 310 is able to detect just the pre-existing beacon transmissions 502.

The time offset, $T_{offset}$, of the additional set of periodic beacons 504 may be randomized through a mechanism such as that described below. The following can be performed by a randomized beacon transmitter (e.g. 104 or 106 in FIG. 1) or a randomized beacon receiver (e.g. 108 in FIG. 1).

First, a basic service set identifier (BSSID) is converted into a decimal number. A BSS includes zero or more non-AP STAs that are connected to the same wireless AP. The BSSID can be the MAC address of the wireless AP.

In a specific example, the AP's BSSID (MAC address)=9c:80:df:46:fb:00 (hex), is converted into a single hex number 9c80df46fb00. This hex representation of BSSID can be converted to a decimal number ($K_{BSSID\_dec}$).

Next, the offset to be applied can be computed as $T_{offset} = K_{BSSID\_dec} \mod C_{beacon\_period}$, where $C_{beacon\_period}$ is the period expressed in decimal between beacons and where both $T_{offset}$ and $C_{beacon\_period}$ are provided in a unit of choice, for example in units of tenths of a millisecond.

In this way because different APs have different unique MAC addresses, the different APs are likely to select different time offset ($T_{offset}$) values and the overlapping offset issue can be addressed.

Since the wireless device 102 knows the BSSID (AP MAC address) (because the AP broadcasts the BSSID to the wireless device in conventional 802.11 operation 102), the wireless device 102 is also able to determine the time offset ($T_{offset}$) for any given AP without the given AP having to send the time offset ($T_{offset}$) value to the wireless device 102.

Alternatively, the given AP can determine a randomized time offset itself (using any of various techniques, which may or may not be covered by standards), and the given AP can notify the wireless device 102 of the randomized time offset using Probe Request/Probe Response messaging (the wireless device 102 sends a Probe Request to the AP, and the AP responds with a Probe Response that includes the randomized time offset value).

The generation of randomized beacons can be performed by just one AP or by each of multiple APs.

Further techniques can be applied to further reduce the chance of continued overlap of beacons. For example, in addition to or as an alternative to randomization in the time offsets from the pre-existing beacon transmissions 502, randomization in the beacon period itself can be applied.

In further implementations, each AP can double the frequency of its existing beacon transmissions (502 in FIG. 5). The wireless device 102 can then alternate between receiving the periodic beacon from one AP and the periodic beacon from the other AP.

Detecting Potential Beacon Overlap

In accordance with some implementations, the wireless device 102 is able to determine whether there is a potential for beacon overlap in beacons transmitted by multiple APs. The wireless device 102 can achieve such a determination by querying the multiple APs to which the wireless device 102 is concurrently associated. The wireless device 102 can query the APs about their periodic beacon timings, such as by using Probe Request/Response messaging or other messaging.

Figure 6:
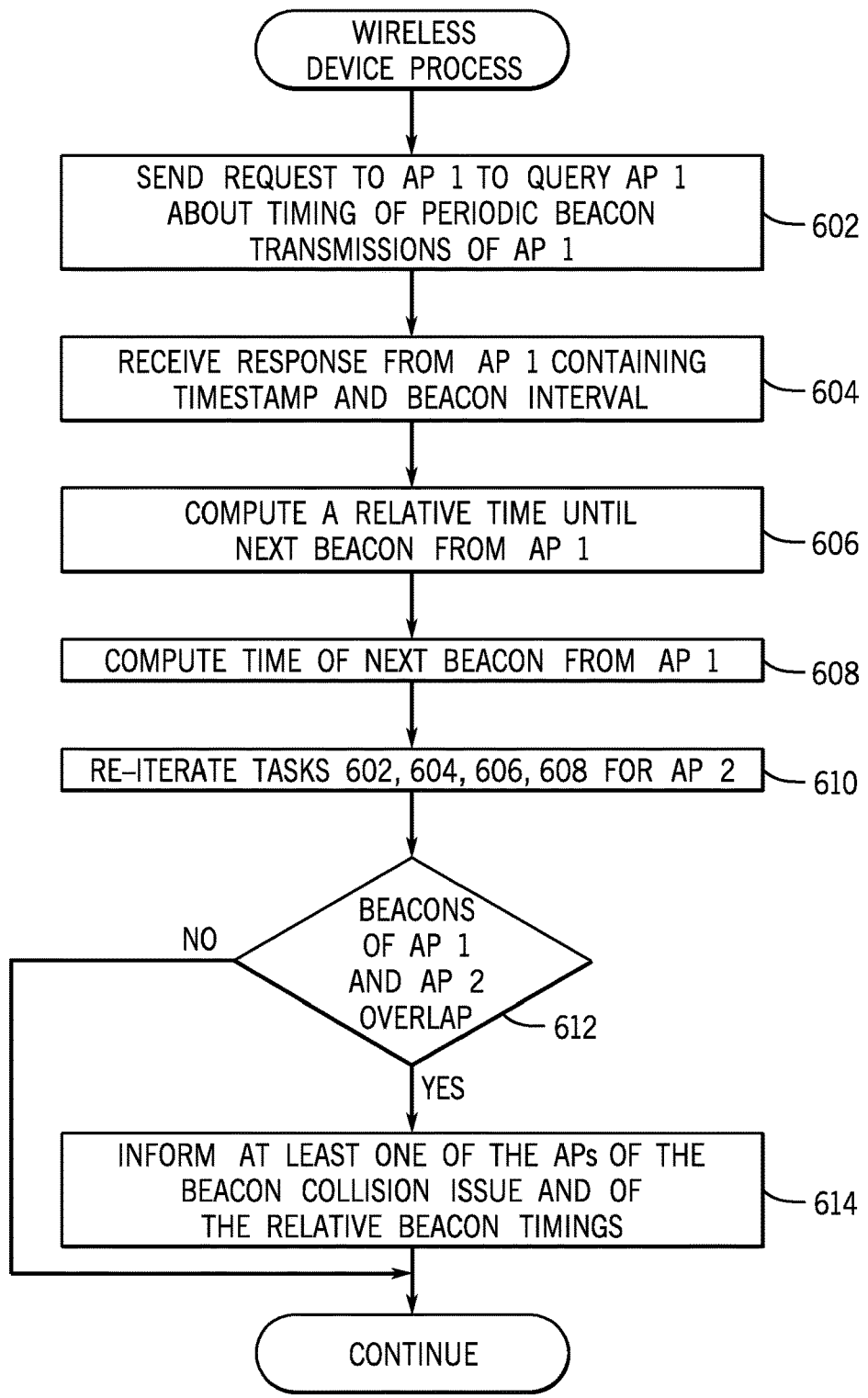
FIG. 6 is a flow diagram of a process of a wireless device, according to further implementations.

More specifically, the tasks that can be performed by the wireless device 102 are shown in FIG. 6. The wireless device 102 sends (at 602) a request to AP 1 to query AP 1 about the timing of the periodic beacon transmissions of AP 1. The wireless device 102 receives (at 604) a response (responsive to the request) from AP 1, which can contain AP 1 timestamp=X, AP 1 beacon interval=Y.

The wireless device 102 uses above information to compute (at 606) a relative time until next beacon, where this relative time is referred to as P. The method makes use of the fact that the beacon period is aligned with the TSF Timer on AP 1.

Note that the wireless device 102 receives the response at a local time, Z, of the wireless device 102. The wireless device 102 computes (at 608) the time of the next beacon from AP 1 (as measured against local time of the wireless device 102) as Z−Q+P, where the wireless device 102 can make a minor adjustment (Q) for the Probe Response propagation delay and the AP and UE processing delays.

The wireless device 102 re-iterates (at 610) tasks 602, 604, 606, and 608 with AP 2.

At this point, the wireless device 102 has the timings of expected periodic beacons from both AP 1 and AP 2 relative to the wireless device's own local clock, and thus the wireless device 102 can determine (at 612) whether beacons from AP 1 and AP 2 are expected to overlap.

The request and response that are communicated between the wireless device 102 and each AP can include any of the following: Probe Request/Probe Response frames, Generic Access Service (GAS) frames, or Access Network Query Protocol (ANQP) frames. Additionally the timings of beacons can be represented as milliseconds, global positioning system (GPS) time, 802.11 time units (TU), or any other encoding that represents time. The determination of the timings of beacons may or may not involve a higher layer time synchronization service.

In response to determining (at 612) that there is an overlapping beacon issue, the wireless device 102 informs (at 614) at least one of the APs (e.g. AP 2) of the issue and of the relative beacon transmission timings of the other AP (e.g. AP 1). AP 2 can then make a note of this and can take a number of different actions to alleviate the potential beacon collision issue at the associated wireless device 102. In further examples, the wireless device 102 can inform both APs of the potential beacon collision issue. The informing can be performed by sending a message from the wireless device 102 to the AP(s).

In some examples, the action taken by an AP to address the potential beacon collision issue can include sending randomized beacon transmissions, as discussed further above. An AP may take on the extra overhead of the randomized beacon transmissions only if the AP determines that the randomized beacon transmissions are to be used to address a potential beacon collision issue. The AP can default to sending pre-existing periodic beacon transmissions, and then in response to notification of a potential beacon collision issue, the AP can add randomized beacon transmissions.

In other examples, an AP (e.g. AP 2) that is informed of the potential beacon collision issue can defer making beacon transmissions until the beacon transmission on the other AP (e.g. AP 1) should have completed. This behavior of deferring a beacon transmission is allowed in implementations where deferring beacon transmissions may occur as a result of a listen-before-talk mechanism, which also applies to beacons. The difference from the listen-before-talk mechanism is that AP 2 does not actually detect the presence of the beacon transmission from AP 1 through carrier sensing, but rather, AP 2 is shifting its beacon transmission in response to signaling information received from an associated client device (wireless device 102).

AP 2 may have a number of such requests from multiple wireless devices, some of which may be listening to the beacons of other APs (e.g. AP 3, AP 4). AP 2 would have to take all such beacon overlap situations into account in determining when its beacon transmission can be made. If AP 2 is unable to find a satisfactory timing for a beacon transmission that avoids collisions with beacons from other APs, then AP 2 can send a message to one or more associated device(s) (i.e. device(s) for which AP 2 has failed to take into account their request). In response to such a message, the associated device(s) can then take some other action, e.g. the associated device(s) can cease attempting to obtain service from one of the APs.

The wireless device 102 can periodically renew its request toward AP 2, which can serve various purposes, as discussed below.

The wireless device 102 may have gone out of coverage of AP 2 or may no longer be associated with AP 2 for some reason. In either case, AP 2 should no longer have to take the possible beacon overlap with AP 1 into account. If AP 2 does not receive a periodic "beacon overlap avoidance renew" message, then AP 2 can infer that the wireless device 102 has gone out of coverage, has been switched off and ceases, is no longer associated to multiple APs, or for any other reason no longer has a beacon overlap situation; as a result, AP 2 stops performing actions to address the beacon collision issue.

If the wireless device 102 no longer has to listen to AP 1, then the wireless device 102 can either explicitly signal this to AP 2 or the same effect can be achieved if the wireless device 102 ceases to transmit the periodic "beacon overlap avoidance renew" message.

The periodic "beacon overlap avoidance renew" message can also be used to account for any synchronization/clock drift between APs. Essentially the wireless device 102 provides an update to AP 2 of the AP 1 periodic beacon transmissions as measured relative to the AP 2 clock.

If the wireless device 102 is concurrently associated with three or more APs, the operations described in the present disclosure can be performed on each AP as the wireless device 102 associates with each new AP.

Downlink Data Transmission Detection

As discussed above, in the scenario where there is a hidden node (one of the APs to which the wireless device 102 is concurrently connected is unable to hear the other AP), there can be an issue with detecting downlink data transmissions. To address the foregoing, the following can be performed.

Solution 1

Figure 7:
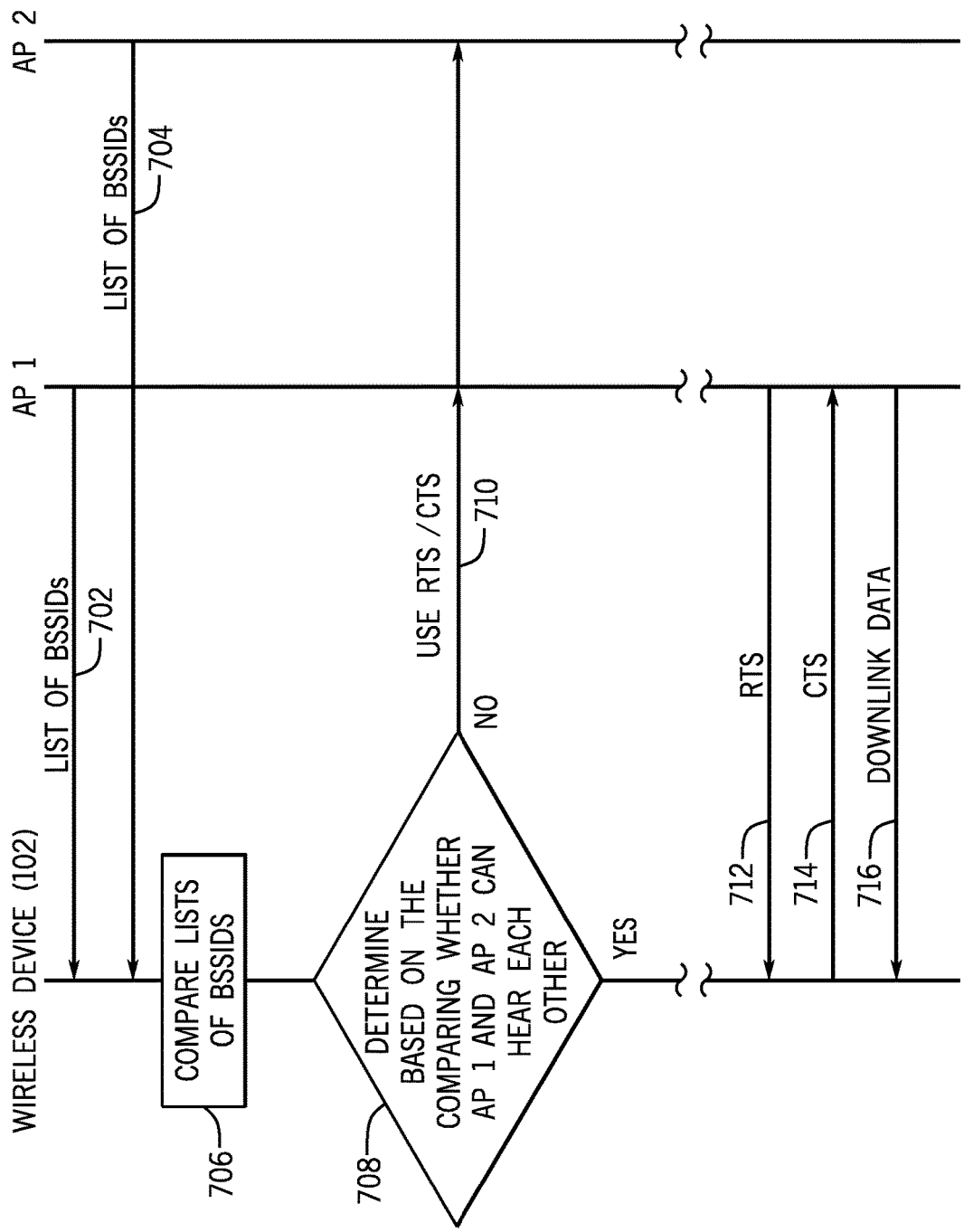
FIG. 7 is a message flow diagram of a process involving a wireless device and multiple access points, according to some implementations.

FIG. 7 is a message flow diagram of a process involving the wireless device 102, AP 1, and AP 2, according to some implementations for a first solution (Solution 1) for addressing potential overlap of downlink data from multiple APs. Each respective AP periodically broadcasts (702, 704) a list of the BSSIDs the respective AP can hear (i.e. MAC addresses of APs that are within coverage range of the respective AP). Unlike traditional "neighbor lists" which only include BSSIDs of other APs in the same ESS that are roaming candidates, this list includes BSSIDs of other networks in range.

The wireless device 102 compares (at 706) the lists of BSSIDs received from AP 1 and AP 2, and determines (at 708) based on the comparing whether the two APs can hear each other or whether one or both APs is a hidden node from the perspective of the other AP. If the list of BSSIDs from AP 1 includes the BSSID of AP 2, and the list of BSSIDs from AP 2 includes the BSSID of AP 1, then the wireless device 102 determines that AP 1 and AP 2 can hear each other.

If the wireless device 102 determines that the two APs can hear each other, then the wireless device 102 can rely on the APs using CSMA-CA to avoid over-the-air collisions in transmissions of downlink data. CSMA-CA includes mechanisms to avoid collisions if the signal can be received and decoded as well as if a signal is received and cannot be decoded (such as noise signals or signals from another radio technology). However, if the wireless device 102 determines that the two APs cannot hear each other (a hidden node scenario), the wireless device 102 sends (at 710) messaging to the APs requesting that they use a request to send/clear to send (RTS/CTS) procedure for downlink data transmissions to the wireless device 102.

In response to the messaging (710), if AP 1 has downlink data to send to the wireless device 102, AP 1 first sends (at 712) an RTS to the wireless device 102 and waits for a CTS to be sent (at 714) by the wireless device 102. AP 1 transmits (at 716) the downlink data in response to receiving the CTS from the wireless device 102. If AP 1 hears a CTS from the wireless device 102 that is destined to another AP, then AP 1 refrains from transmitting the downlink data.

The procedure of FIG. 7 may be repeated from time to time since propagation conditions between the AP's may change over time. If the wireless device 102 disassociates from one AP then the wireless device 102 should notify the remaining AP that the remaining AP can cease using RTS/CTS for downlink data transmissions.

Solution 2

In alternative implementations of the present disclosure, a second solution (Solution 2) for addressing potential overlap of downlink data from multiple APs can be used. With Solution 2, the periodic sending of lists of BSSIDs from both AP 1 and AP 2 is avoided to reduce messaging overhead.

Rather, the wireless device 102 can issue a query to each AP to either (1) ask the AP for a full list of all the BSSIDs that that AP is within coverage range of, or (2) ask the AP whether the AP is within coverage range of another AP having a particular BSSID (where the other AP is an AP with which the wireless device 102 wishes to communicate).

The query sent by the wireless device 102 to an AP can be an ANQP query, or the query can be an extended version of the IEEE 802.11 Neighbor Report Request providing all neighbor APs instead of just those APs in the same extended service set (ESS) that are roaming candidates.

The remaining tasks of Solution 2 are the same as tasks 708-716 in FIG. 7.

It is expected either that both APs are within coverage range of each other, or else that neither is within coverage range of the other. There is however, the possibility that AP 1 can hear AP 2, but AP 2 cannot hear AP 1, since while the radio channel in each direction between the APs may be considered reciprocal, the receive sensitivity of the receivers in the APs can be different. A first AP can "hear" a second AP if the first AP is able to receive wireless signals transmitted by the second AP. The first AP may or may not be able to decode these signals. Hence it may be beneficial to determine from each AP whether or not it can hear the other AP. If AP 1 is able to receive wireless signals transmitted by AP 2 but AP 2 is unable to receive wireless signals transmitted by AP 1, then the wireless device 102 can either:

(1) only configure use of RTS/CTS for the AP (AP 2 in the above example) that is unable to receive wireless signals transmitted from the other AP (AP 1 in the example), or (2) configure RTS/CTS from/to both APs to be on the safe side (since there is likely to be considerable path loss between APs).

System Architecture

Figure 8:
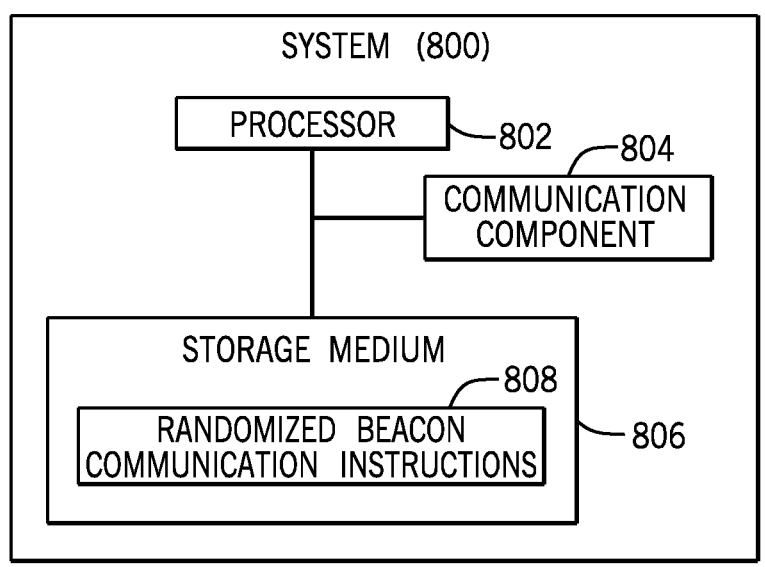
FIG. 8 is a block diagram of an example network node, according to some implementations.

FIG. 8 is a block diagram of an example system (or network node) 800, which can represent any one of: a device (e.g. wireless device 102) or an AP (e.g. AP 1 or 2). The system 800 can be implemented as a computing device or an arrangement of multiple computing devices.

The system 800 includes a processor (or multiple processors) 802, which can be coupled to a communication component (or multiple communication components) 804 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 802 can also be coupled to a non-transitory machine-readable or computer-readable storage medium (or storage media) 806, which can store randomized beacon communication machine-readable instructions 808 that are executable on the processor(s) 802 to perform various tasks as discussed above.

The storage medium (or storage media) 806 can include one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   computing, by a deterministic random number generator at a first wireless communication node, a pseudorandom number, the deterministic random number generator employing the same random number generation algorithm as a random number generator of a second wireless communication node;
   determining a time of a next randomized beacon transmission using the computed pseudorandom number;
   transitioning the first wireless communication node from a power saving mode to an active receiving state at a time based on the determined time; and
   receiving, by the first wireless communication node over a wireless link while the first wireless communication node is at the active receiving state, a randomized beacon transmission at the determined time.

2. The method of claim 1, wherein the first wireless communication node is a wireless access network node or a wireless device.

3. The method of claim 1, further comprising:
   communicating, by the first wireless communication node with another wireless communication node over a wireless link, a value associated with the deterministic random number generator.

4. The method of claim 3, wherein the communicating of the value associated with the deterministic random number generator comprises communicating at least one of a value of a linear feedback shift register, a seed value, or a counter value.

5. The method of claim 1, wherein the first wireless communication node is a wireless local area network (WLAN) non-access point (AP) station (STA) that transitions from the power saving mode to the active receiving state at the time based on the computed pseudorandom number, wherein receiving the randomized beacon transmission by the first wireless communication node comprises receiving, by the non-AP STA from the second wireless communication node over the wireless link, the randomized beacon transmission at the determined time.

6. The method of claim 1, wherein the first wireless communication node is a WLAN non-AP STA that is associated with multiple APs on different channels, the method further comprising:
   in response to the computed pseudorandom number, tuning a receiver of the first wireless communication node to a channel to receive the randomized beacon transmission from an AP.

7. The method of claim 1, wherein computing the pseudorandom number and determining the time of the next randomized beacon transmission are performed every periodic beacon transmission period.

8. The method of claim 1, wherein the first wireless communication node comprises a receiver that receives the randomized beacon transmission over the wireless link, the method further comprising:
   determining, by the first wireless communication node prior to the receiving, the time based on the computed pseudorandom number.

9. The method of claim 1, wherein the time of the next randomized beacon transmission is based on a timing offset from a time at which a periodic beacon transmission is communicated.

10. The method of claim 1, wherein computing the pseudorandom number by the deterministic random number generator comprises selecting a number within a specified range.

11. The method of claim 1, wherein computing the pseudorandom number by the deterministic random number generator comprises using a Medium Access Control (MAC) address of an access point.

12. A wireless device comprising:
   a wireless interface to communicate with a first access point; and
   at least one processor configured to:
      compute, by a deterministic random number generator, a pseudorandom number;
      determine a time of a next randomized beacon transmission using the computed pseudorandom number;
      awaken the wireless device from a power saving mode at a time based on the determined time; and
      receive, from the first access point while the wireless device is awakened from the power saving mode, the next randomized beacon transmission at the determined time.

13. The wireless device of claim 12, wherein the at least one processor is configured to further:

determine whether a beacon overlapping issue exists between the first access point and at least another access point; and in response to determining that the beacon overlapping issue exists, send, to one or more of the first access point and the at least another access point, an indication of the beacon overlapping issue.

14. The wireless device of claim 13, wherein the determining of whether the beacon overlapping issue exists comprises:

computing timings of beacon transmissions from the first access point and the at least another access point; and determining whether the beacon overlapping issue exists based on the computed timings.

15. The wireless device of claim 12, wherein the at least one processor is configured to further:

determine whether the first access point is able to receive wireless signals transmitted by a second access point; and in response to determining that the first access point is unable to receive wireless signals transmitted by the second access point, send an indication to at least one of the first and second access points to use a request to send/clear to send (RTS/CTS) procedure for communicating data packets.

16. The wireless device of claim 15, wherein determining whether the first access point is able to receive wireless signals transmitted by the second access point comprises:

determining whether a basic service set identifier (BSSID) of the second access point is on a list, provided by the first access point, of BSSIDs which are within coverage of the first access point.

17. The wireless device of claim 15, wherein determining whether the first access point is able to receive wireless signals transmitted by the second access point comprises:

querying the first access point whether the first access point is able to receive wireless signals transmitted by the second access point.

18. An access point comprising:

a wireless interface to communicate with a wireless device; and at least one processor configured to:

compute, by a deterministic random number generator, a random number;

determine a time of a next randomized beacon transmission using the computed random number;

activate a transmitter of the wireless interface at a time based on the determined time; and cause transmission, by the activated transmitter to the wireless device over a wireless link, the randomized beacon transmission at the determined time.

19. The access point of claim 18, wherein the causing of the transmission of the randomized beacon transmission is in response to:

receiving notification that the first access point has an overlapping beacon issue with at least a second access point.

20. The access point of claim 18, wherein the at least one processor is configured to cease the randomized beacon transmission in response to determining that the first access point is no longer associated with the wireless device.

* * * * *